(12) United States Patent
Horvitz et al.

(10) Patent No.: US 9,958,288 B2
(45) Date of Patent: May 1, 2018

(54) PLANNING UNDER DESTINATION UNCERTAINTY

(71) Applicant: Microsoft Technology Licensing, LLC, Redmond, WA (US)

(72) Inventors: Eric J. Horvitz, Kirkland, WA (US); John C. Krumm, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 13/831,483

(22) Filed: Mar. 14, 2013

(65) Prior Publication Data
US 2014/0278091 A1 Sep. 18, 2014

(51) Int. Cl.
*G01C 21/00* (2006.01)
*G01C 21/36* (2006.01)
*G01C 21/34* (2006.01)
*G06Q 30/02* (2012.01)
*G06Q 10/04* (2012.01)

(52) U.S. Cl.
CPC ..... *G01C 21/3679* (2013.01); *G01C 21/3453* (2013.01); *G01C 21/3617* (2013.01); *G01C 21/3697* (2013.01); *G06Q 10/047* (2013.01); *G06Q 30/0283* (2013.01)

(58) Field of Classification Search
CPC .............. G01C 21/3679; G01C 21/3453
See application file for complete search history.

(56) References Cited

U.S. PATENT DOCUMENTS

| 2007/0010942 A1* | 1/2007 | Bill ................... G01C 21/3617 701/424 |
| 2008/0005055 A1* | 1/2008 | Horvitz ................ G06Q 10/04 706/62 |
| 2008/0005067 A1* | 1/2008 | Dumais ............ G06F 17/30528 |
| 2008/0249667 A1* | 10/2008 | Horvitz ............... B60W 40/072 701/1 |
| 2011/0238289 A1* | 9/2011 | Lehmann ........... G01C 21/3438 701/533 |
| 2012/0173134 A1* | 7/2012 | Gutman ............. G01C 21/3469 701/400 |
| 2012/0179365 A1 | 7/2012 | Miyahara et al. |
| 2012/0265433 A1* | 10/2012 | Viola .................. G01C 21/3617 701/410 |
| 2013/0204527 A1* | 8/2013 | Schilling ................ G01C 21/34 701/533 |

OTHER PUBLICATIONS

PCT Search Report, PCT/US2014/22855, Filed date Mar. 10, 2014, dated Oct. 31, 2014, 10 pages.

* cited by examiner

*Primary Examiner* — Jess Whittington

(57) ABSTRACT

The subject disclosure is directed towards resolving an uncertain transportation context by suggesting one or more potential diversions. An automated routing system may generate routing information that includes map data as well as a location of a diversion having an expected cost in compliance with the uncertain transportation context. Such a diversion may be a waypoint that satisfies one or more user needs given an unknown/uncertain destination.

20 Claims, 6 Drawing Sheets

PLANNING UNDER DESTINATION UNCERTAINTY

BACKGROUND

An individual traveling from one location to another location typically employs a map as a guide. A number of commonly available systems support map generation and route planning. By way of illustration, the user can input a start position and a destination/endpoint and the system can yield suitable driving directions and/or appropriate map(s) (e.g., highlighting a route). These systems may overlay the map with additional information, such as current traffic patterns, weather information and/or the like. These systems can be utilized in connection with other devices, such as personal computers, laptop computers, handhelds, cell phones and the like.

Vast amounts of information may be associated with the user's transportation context, including a current geographic location and, if the user is traveling, a surrounding geographic area. The destination also constitutes an integral part of the transportation context. However, conventional systems employing Global Positioning System (GPS)-based techniques (as well as other conventional techniques) typically require the user to directly input the destination. Users may not input a destination every time that they are traveling and thus, relevant information corresponding to the destination and/or an associated route may not be provided to the users. For instance, the user may not enter a destination when traveling to a location to which he/she often travels such as work, home, school and/or the like; accordingly, the relevant information is not provided. One example of such relevant information may indicate helpful waypoints en route to the destination, but such information is not provided if the destination is unknown or uncertain.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards resolving uncertainty regarding a transportation context. In one aspect, the transportation context generally refers to a user's current/start position, a destination, routes to the destination, planned/unplanned waypoint positions en route to the destination, route planning preferences/goals/conditions and/or the like. Any uncertainty in the transportation context, such as destination uncertainty, may result in inaccurate divergence planning unless resolved through divergence modeling and expected cost computation as described herein.

In one aspect, an automated routing system may suggest opportunistic diversions on trips to uncertain primary destinations when an unplanned waypoint, such as a rest stop or a refueling station, may be desired. The automated routing system may perform a probabilistic analysis for each unplanned waypoint to identify an optimal diversion while the user travels to one of the uncertain destinations. In one aspect, the automated routing system may compute an expected value of asking a user about the primary destination in order to remove uncertainty regarding the user's goal.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
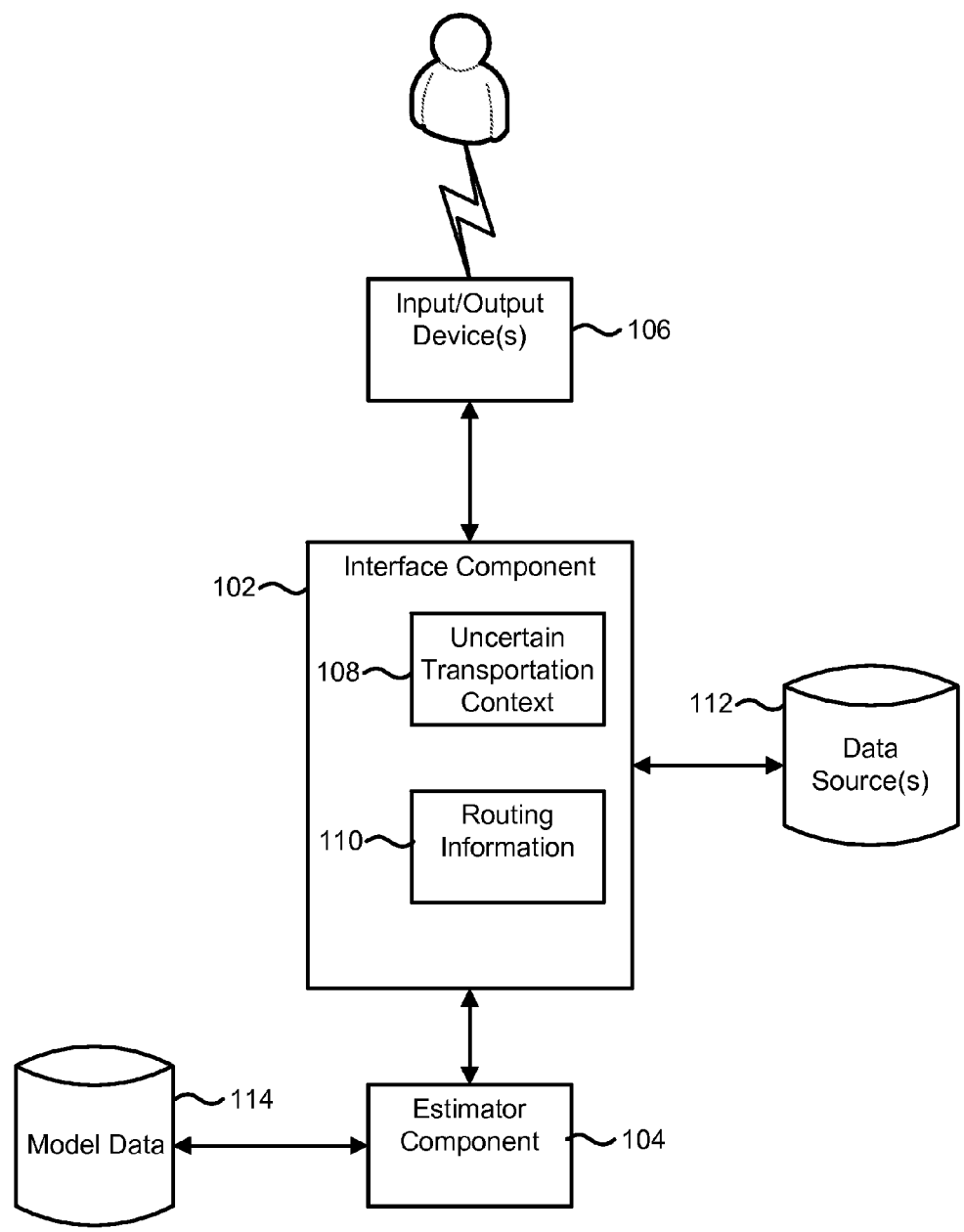
FIG. 1 is a block diagram illustrating an example system for vehicle planning under destination uncertainty according to one example implementation.

Various aspects of the technology described herein are generally directed towards an automated routing system configured to generate routing information comprising one or more suggested diversions given an uncertain transportation context. In one example implementation, the automated routing system may determine whether the one or more suggested diversions are in compliance with the uncertain transportation context via probabilistic modeling. It is appreciated that the automated routing system is not limited to embodiments employing probabilistic modeling and may comprise other embodiments related to divergence planning.

Probabilistic modeling typically considers rule-based divergence modeling and expected costs computing associated with consuming additional time to divert to and engage in an opportunistic task. In one example implementation, the automated routing system may select the one or more suggested diversions that have a minimum expected cost corresponding to a current, yet uncertain, route to an uncertain destination. Expected costs may refer to an estimated driving time and/or distance to a waypoint that satisfies a current need. The minimum expected cost, therefore, corresponds to an appropriate waypoint that satisfies the current need but does not substantially deviate from the primary destination. In another example implementation, the minimum expected cost may incorporate a cost benefit/economic analysis to determine whether a particular waypoint satisfies the current need, such as whether to refuel a car based on a consideration of the pricing and distance between completing gas stations.

By examining a vehicle's current environment, the automating routing system identifies a set of candidate destinations, where each candidate destination corresponds to a probability of being an actual destination, and a set of candidate diversions. A candidate diversion, for instance, may be a specific resource located within reach of the vehicle's current position and/or future position. For each candidate destination, the expected costs discussed above, therefore, determine which of candidate diversion(s), if any, can provide a benefit at the lowest minimum cost in terms of time/distance. The transportation context may provide different thresholds for the minimum cost based upon certain rules such that important tasks have higher thresholds and less important ones have lower thresholds. For example, re-fuelling the vehicle when a fuel level falls below a particular volume is more important than other tasks, such as obtaining coffee, because a lack of fuel renders the vehicle disabled.

In response to vehicle movement, the automated routing system facilitate vehicle planning under destination uncertainty by modifying probabilities for each candidate destination and re-computing the expected costs for each candidate diversion. The automating routing system also may prune one or more potential diversions as candidates given the vehicle's environment and the vehicle's movement within that environment. If the vehicle travels beyond a pre-determined distance from a candidate diversion and/or a candidate destination, then that diversion or destination is not likely to be selected by the user and may be eliminated from subsequent expectation cost computations. In another example implementation, the automated routing system resolves at least some destination uncertainty by interrupting the vehicle user with a destination query, particularly if the benefit of asking the user, as defined by an expected value, outweighs the cost related to the interrupting the user.

Another example implementation may configure the probabilistic model to incorporate context-sensitive features such that expected costs may be adjusted based upon, for example, time-sensitive features by accessing related data from an online calendar and/or a traffic application/service. The user may prefer to specify approximately when a diversion suggestion is desired. Using the automated routing system, for example, the user may define a time interval ranging from a few minutes to a few hours. The automated routing system also may suggest diversions that correspond to a time interval (e.g., twenty minutes) learned from user related data. The minimum expected diversion cost may correspond to any position within the pre-defined time interval.

The automated routing system may be configured to implement opportunistic route planning given an uncertain destination. The automated routing system may receive user queries/commands and/or automatically identify relevant/helpful opportunities during a trip to the uncertain destination. These opportunities may include needs for goods or services, such as emergencies. Some of these opportunities may refer to pre-defined user preferences in response to contingencies, such as "search for a gas station when a fuel tank has less than ten (10) percent in fuel." The automated routing system may enhance such opportunistic planning by communicating a reservation request to a nearest vehicle service station when the fuel tank is approaching the ten percent threshold. Other opportunities may refer to unknown or uncertain user goals/conditions, such as "search for a gas station when an estimated economic savings exceeds ten (10) dollars" or "search for a restaurant when hungry".

The automated routing system may render probabilistic predictions of a driver's destination and/or a planned diversion to a waypoint. By way of example, the automated routing system may employ various techniques to match a partial route with stored routes, to cluster GPS data to find a user's significant locations like home and work, the user's mode of transportation, historical data and/or the like.

The automated routing system provides vehicle drivers with efficient diversions to waypoints that may address an acute or standing interest or need on the way to the destination. As an example, a driver may issue a voice search in pursuit of an entity or service, such as a rest stop or a refueling or recharging station while driving to the primary destination. Alternatively, the automated routing system, embedded within an onboard device or communicating through a cloud service, may estimate a driver's or passenger's rising needs or background interests, process data related to the user's time availability, and recognize desirable opportunities to modify the current trip. The automated routing system may alert or otherwise inform the driver about such opportunities. The automated routing system may generate a revised route from the current location to the primary destination, which passes through or near the suggested diversion.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and mobile computing in general.

FIG. 1 is a block diagram illustrating an example system for vehicle planning under destination uncertainty according to one example implementation. The example system occasionally may be referred to as "a routing system" or a variation thereof. Example components of the automated routing system may include an interface component 102 communicably coupled to an estimator component 104 as illustrated in FIG. 1.

Various input/output devices 106 may be used to present and/or exchange information corresponding to an uncertain transportation context 108, routing information 110 and/or other data. As described herein, the uncertain transportation context 108 generally refers to portions of the transportation context of which the automated routing system lacks sufficient prior knowledge. The uncertain transportation context 108 may refer to a user's route—including a primary destination, any planned waypoint diversion and/or the like—and various user preferences regarding user goals, interests, conditions and/or the like. The routing information 110 may indicate one or more waypoint diversions that may be visited, given the uncertain transportation context 108, while the user incurs a minimum expected cost, but accomplishes one or more goals or interests.

According to one example implementation, the routing information 110 also may include at least one route to the one or more waypoint diversions, to a candidate destination and/or back to a start position (e.g., a return trip). The at least one route may include an optimal route to the candidate destination that includes visiting the one or more waypoint diversions. The optimal route, for example, may correspond with a minimum estimated extra driving time/distance. The routing information 110 also may include map data depicting a route to the candidate destination after the visiting the one or more waypoints and/or another route back to the starting position from the candidate destination.

The interface component 102 may be configured to reproduce question data, such as a destination inquiry, as an audio/visual expression via one or more of these input/output devices 106. For example, the interface component 102 may output a voice recording conveying the destination inquiry and/or a graphical representation corresponding to a geographical region surrounding a candidate destination, a start/current position and/or a candidate diversion between the candidate destination and the start position. The interface component 102 also may store input data, such as commands or the user's answer to a destination inquiry, via one or more of the input/output devices 106 (e.g., a microphone for voice commands, a touch screen on a display for touch commands and/or the like).

The interface component 102 may be configured to access and retrieve various data from data source(s) 112. It is appreciated that the data source(s) 112 may comprise, but is not limited to, data stores (e.g., commercial databases, proprietary repositories, personal files on user-controlled network storage and/or the like), sensors/measuring instruments (e.g., GPS location data, vehicle diagnostic data, velocity data, time clock data and/or the like), Internet resources (e.g., web pages), data feeds (e.g., traffic updates, weather forecasts, newscasts and/or the like) or any other accessible source of input data. According to one example implementation, the data source(s) 112 may facilitate probabilistic (e.g., opportunistic) plan divergence by providing data corresponding to a user, such as historical data (e.g., a driving history), disparate users of a user group (e.g., family-related data), topography of a geographical area (e.g., ground cover data), efficient routes to candidate destinations/diversions, trip time distributions, a current trip (e.g., a current/start position, a time and/or the like). It is appreciated that while the portions of the present disclosure describe plan divergence with respect to one or more waypoints, the user may divert from a current route for other reasons besides a waypoint, including avoiding bad weather or congested traffic, attending to emergencies, and/or the like.

According to one example implementation, the interface component 102 may query the user via the input/output device(s) 106 and/or the data source(s) 112 for user related data, candidate destination information, candidate diversion information and/or other data associated with estimating divergence costs. Because the user's plan is uncertain or unknown, such costs correspond to diverting towards one or more waypoints en route to a candidate destination. Each candidate destination may be assigned equal probabilities of being an actual destination or, alternatively, each assigned probability may be pre-defined. In another example implementation, a number of factors (e.g., user history/preferences, time/day information, waypoint popularity and/or the like) may contribute to inferring a likely destination as described below.

After processing the data provided by the data source(s) 112, in one example implementation, the estimator component 104 may generate model data 114 comprising a probabilistic model that is configured to compute expected costs corresponding to diverting a route to one or more waypoints. As described herein, the model data 114 may be used to resolve uncertainty with respect to the user's transportation context.

Figure 2:
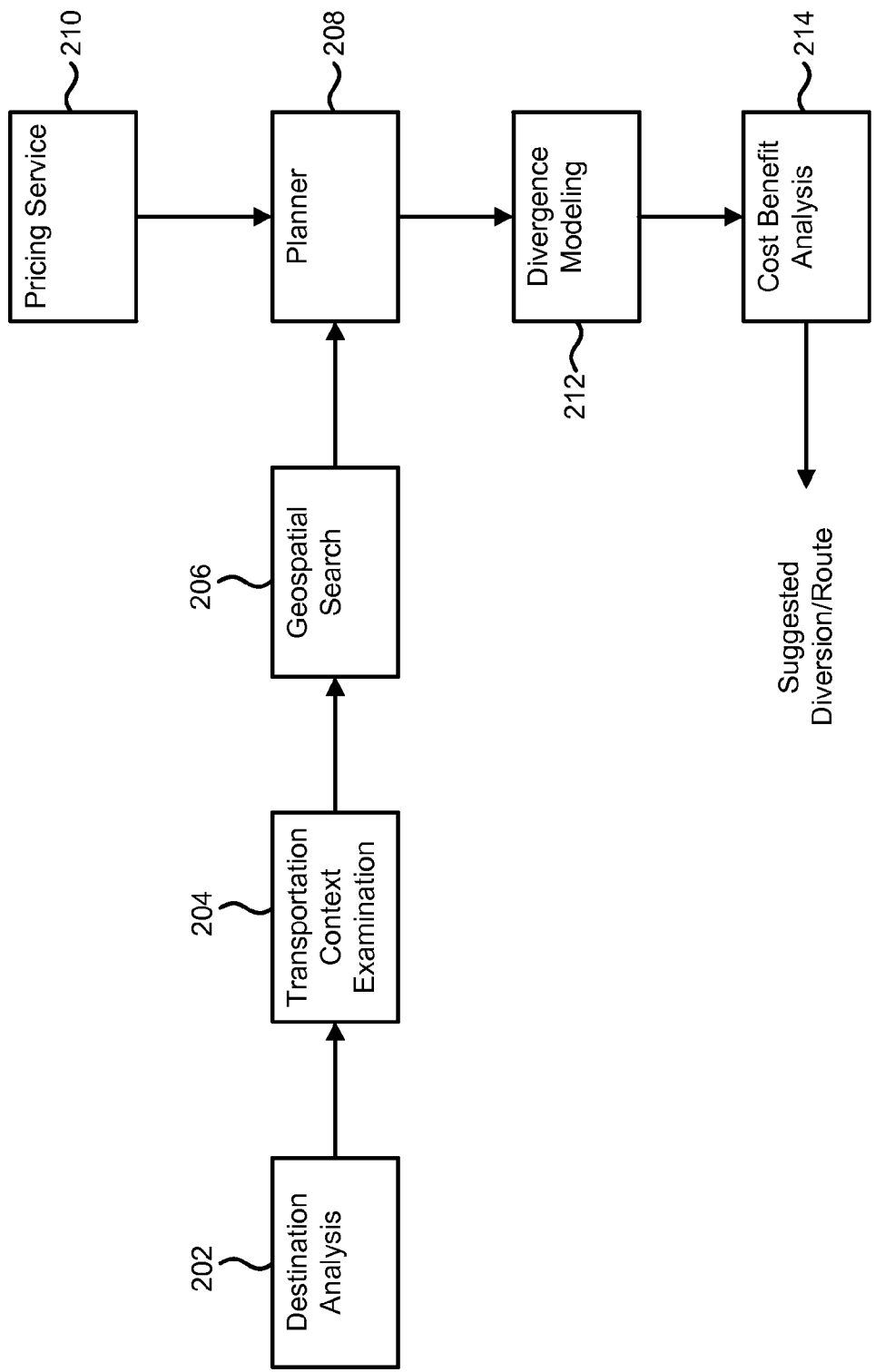
FIG. 2 is a functional block diagram illustrating divergence modeling and expected cost computation according to one example implementation.

FIG. 2 is a functional block diagram illustrating divergence modeling and expected cost computation according to one example implementation. Divergence modeling and expected cost computation facilitates the identification of one or more diversions in view of transportation context uncertainty, such as destination uncertainty. An interface component (e.g., the interface component 102 of FIG. 1), an estimator component (e.g., the estimator component 104 of FIG. 1) and/or other components of an automated routing system (e.g., the example system of FIG. 1) may perform at least one operation being depicted in FIG. 2.

The estimator component, for example, may initiate divergence modeling and expected cost computation with an operation referred to as destination analysis 202 in which a set of candidate destinations is identified and each candidate destination is assigned a probability indicating a likelihood of being visited by a user. To compute probabilities over destinations, the destination analysis 202 may employ a destination prediction algorithm based upon the expectation that users often drive efficiently toward a destination. The method computes destination probabilities p(D) for a subset of candidate destinations D contained in a set of candidate destinations $D_s$ where $D \in D_s$. The subset of candidate destinations may include one or more road intersections within a driving range (e.g., 60 minutes or five miles) from the start of the trip.

As the user moves to new intersections, the destination analysis 202 may compute an estimated driving time to the subset of candidate destinations using a route computation algorithm (e.g., RPHAST). When the user reaches a new intersection, the destination analysis may determine, for each candidate destination, whether the estimated driving time to that candidate destination changed (e.g., increased or decreased) as compared to the state at the previous intersection. In another example implementation, the destination analysis 202 also may use each candidate destination's prior probability to update the destination probabilities p(D). Such a prior probability may be derived from the user's driving history and/or recorded road traffic data. Values for p(D) change over the course of an example trip. As the user continues en route to an uncertain destination, the candidate destinations with the largest probabilities tend to cluster near the trip's end.

With the destination predictions completed as described above, in an operation referred to as a transportation context examination 204, user related data is mined for indicia as to the user's goals, conditions, needs, tasks, interests and/or the like, according to one example implementation. Such indicia include, but are not limited to, user preferences, including pre-defined settings and/or learned driving habits from historical data (e.g., a driving history) and/or the like. These preferences attempt to improve estimation of an opportunistic route as an alternative to a destination-centric route.

During an operation depicted as a geospatial search 206, a plurality of waypoints is located between a start/current position and each candidate destination. From the plurality of waypoints, a planner 208 selects one or more candidate diversions using various criteria. As an example, the planner 208 transforms the plurality of waypoints identified during the geospatial 206 and price data from a pricing service 210 into a set of waypoints having at least a minimum likelihood of complying with the user's uncertain transportation context.

Using feature information collected from various data sources, an operation known as divergence modeling 212 generates model data for estimating expected divergence costs associated with each subset of the set of candidate diversions. For each candidate destination, a cost benefit analysis 214 may use such model data when computing expected divergence costs for each subset of candidate diversions. The cost benefit analysis 214 may further process the expected divergence costs and produce a suggested diversion/route. One optional implementation may combine a goal satisfaction model with the divergence modeling 212 when performing the cost benefit analysis 214 to suggest a divergence that satisfies both models. The cost benefit analysis 214 may compute an expected cost for diverting a driver from the current route to waypoint in order to address a specific goal or need (e.g., an emergency, work-related goals, a child/family need and/or the like).

Each candidate diversion may be sensitive to the destination likelihoods/probabilities, locations of other candidate diversions and/or environment related data (e.g., the topology of a road network). Each candidate destination D is part of a set of destinations, $D_s$. The expected cost of diverting to point Z when the driver is currently at point L is $$c_z = \sum_{D \in D_s} p(D)[C(L \to Z \to D) - C(L \to D)] \qquad (1)$$

The destination probabilities p(D) come from the inferences about destinations as described herein. The quantity C(L→Z→D) refers to the cost of traveling from the current location L, to the waypoint candidate at Z, and then on to the predicted destination D. The quantity C(L→D) refers to the cost of traveling direction from the current location L to the predicted destination D. Thus, C(L→Z→D)-C(L→D) refers to the extra cost associated with traveling to the waypoint candidate Z.

The automated routing system may re-compute these probabilities as the trip progresses. The automated routing system may use Equation (1) to compute the best waypoint Z*associated with the minimum expected cost of diversion, by substituting in each waypoint candidate Z, computing the expected cost of divergence for each candidate, and seeking the optimal waypoint as follows:

$$Z^* = \operatorname*{argmin}_{Z \in Z_s} Z \sum_{D \in D_s} p(D)[C(L \to Z \to D) - C(L \to D)] \qquad (2)$$

Equation (2) may represent an expected cost via any unit of measure, such as Euclidian distance and/or driving time. The automated routing system may employ real-time and forecasted traffic flows in computing expected divergences that are measured in additional expected driving times. Another example implementation may modify Equation (2) to consider both the cost of transportation and the cost of goods/services during the cost benefit analysis 214 in order to balance a total driving distance of travel with less expensive goods, e.g., traveling to a more distant fueling station that provides less expensive gasoline. In addition to the raw driving times, Equation (2) may impose a U-turn penalty of a number of seconds (e.g., one-hundred twenty (120) seconds).

Yet another example implementation may modify Equation (2) to incorporate goal importance indicia into the expected divergence costs such that the user may maximize goal completion without providing the automated routing system with a probable destination. The goal important indicia may include priorities assigned to optional tasks that are also capable of being fulfilled at a number of different locations. For instance, vehicle-related tasks are assigned higher priorities than personal tasks while entertainment-related tasks are assigned the lowest priorities. Because a higher priority is attributed to a more important task (e.g., filling a low fuel tank) than a less important task (e.g., finding a coffee shop), the modified Equation (2) may compute a lower expected cost for the more important task even though the less important task may be closer distance/time-wise. As another example, the automated routing system employs the modified Equation (2) to optimize route planning for a commercial vehicle (e.g., a medical service vehicle, a taxi, a commercial truck and/or the like).

After identifying one or more diversion waypoints having the minimum expected cost, the cost benefit analysis 214 may generate an ideal route from a current location to a candidate destination, which passes through the one or more diversions waypoints. A class of fast routing technique known as "contraction hierarchies" compute driving times and routes from a single location (i.e. intersection) to many other locations (i.e. candidate destinations). A graph representing the road network is augmented by short, pre-computed shortest paths that the cost benefit analysis 214 may use to more quickly compute long shortest paths.

Figure 3:
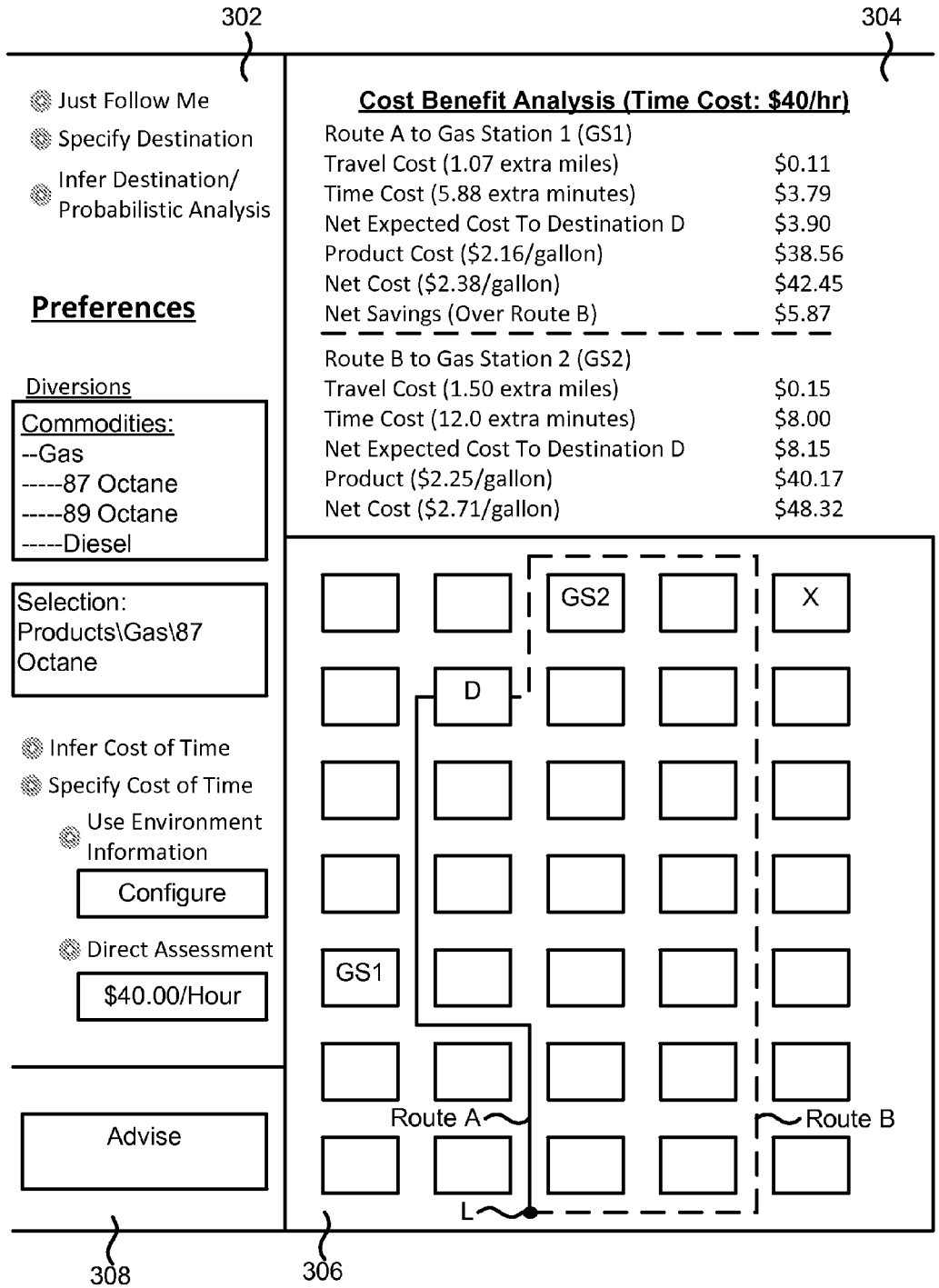
FIG. 3 illustrates an example embodiment of an example front-end interface to an automated routing system.

FIG. 3 illustrates an example embodiment of an example front-end interface associated with an automated routing system. Example elements of the example front-end interface may include a settings element 302, a text element 304, a graphical element 306 and a control element 308. The setting element 302 generally refers to pre-configured settings to facilitate divergence modeling when a transportation context is uncertain or unknown. The text element 304 presents various textual data to a user via an output device, such as a display device. The graphical element 306 presents to the user routing information as a visual expression (e.g., a map). When the control element 308 labeled "Advise" is activated, the automated routing system initiates an expected cost computation and determines whether there are any suitable waypoints given the uncertain transportation context. Some example embodiments provide automatic activation of the automated routed system instead of, or in addition to, manual activation via the control element 308 and/or the driver.

As illustrated, the setting element 302 may include selections for adjusting the divergence modeling and expect cost computation, such as "Just Follow Me", "Specify Destination", and "Infer Destination/Probabilistic Analysis". "Just Follow Me" refers to performing no plan divergence. "Specify Destination" refers to performing plan divergence after the user inputs a destination. "Infer Destination/Probabilistic Analysis" refers to performing plan divergence after predicting a most likely destination given an uncertain transportation context.

The following description refers to one example implementation of the automating routing system when performing an example "Infer Destination/Probabilistic Analysis". The automated routing system may compute destination probabilities p(D) for a subset of destinations D contained in a set of candidate destinations $D_s$, where $D \in D_s$. The subset of candidate destinations may be selected from user related data, such as historical data and/or preference data. The subset of candidate destinations also may include locations corresponding to road intersections within a certain driving distance (e.g., sixty (60) minutes driving time) from a start position.

The visual expression presented through the graphical element 306 represents the user's current partial trip as a sequence of intersections separating a grid of candidate destinations and/or candidate diversions. As a vehicle moves from start position L to new intersections, the automated routing system computes the driving times and/or distances to a subset of candidate destinations and a subset of candidate diversions. When the vehicle reaches a new intersection, the automated routing system identifies, for each candidate diversion, whether the driving time to that candidate diversion has increased or decreased as compared to a vehicle state at the previous intersection. Decreased times are evidence that the user may be driving to the candidate diversion.

According to one example implementation, the automated routing system identifies an optimal subset of diversions out of a set of candidate diversions in light of uncertainty with respect to the transportation context, including the destination. The set of candidate diversions may include vehicle service stations (e.g., fuelling stations, electric car charging stations, repair stations and/or the like). It is appreciated that although FIG. 3 depicts gas stations as diversions, the present disclosure may be applied to any type of diversion for vehicle planning.

As vehicle motion commences, the automated routing system computes destination probabilities, p(D), D∈$D_s$ based upon the vehicle transportation context. The automated routing system continues to compute and update destination probabilities, p(D), D∈$D_s$ during the trip. At some point during the trip, assume that the user requests a recommendation for the best stop to make for refueling. The automated routing system computes expected costs corresponding to each diversion in terms of additional distance and/or travel time to the primary destination.

Assuming that the vehicle is currently located at point L and the inferred destinations are either points D or X, each destination has an equal probability/likelihood (p(D)=p(X)=½). For waypoints GS1 and GS2, which are not destinations but candidate diversions (e.g., gas stations), the automated routing system sets p(GS1)=p(GS2)=0. Furthermore, the automating routing system establishes an expected cost y associated with travelling from start position L to gas station GS1 C(L→GS1) and an expected cost r associated with travelling from start position L to gas station GS2 C(L→GS2). The automated routing system may monitor vehicle related data and determine that the user has an need to stop for fuel, for example, at one of gas stations located at positions GS1 and GS2. The automated routing system may identify an optimal gas station to recommend to the user based upon a cost benefit/economic analysis.

The following describes one example cost benefit analysis using the values provided for FIG. 3. The automated routing system initially may compute the expected costs of choosing the gas station at GS1 versus GS2. The expected cost for any diversion is equal to summation of the products of the probability of incurring such a cost based on the likelihood of each destination and the expected cost associated with that destination.

As illustrated in FIG. 3, the expected cost associated with traveling from start position L to gas station GS1 and then, from gas station GS1 to candidate destination D is $3.90. Assuming, for the sake of clarity, the expected cost associated with traveling from start position L to gas station GS1 and then, from gas station GS1 to candidate destination X is $11.00, the expected cost of choosing the gas station at GS1, given the destination uncertainty, is computed as follows:

$$c_{GS1} = p(D)[C(L \to GS1 \to D) - C(L \to D)] +$$
$$p(X)[C(L \to GS1 \to X) - C(L \to X)] +$$
$$p(GS1)[C(L \to GS1 \to GS1) - C(L \to GS1)] +$$
$$= 0.5[3.90] + 0.5[11.00] + 0.0[y - y]$$
$$= 7.45$$

As illustrated in FIG. 3, the expected cost associated with traveling from start position L to gas station GS2 and then, from gas station GS2 to candidate destination D is $8.15. Assuming, for the sake of clarity, a total expected cost associated with traveling from position L to gas station GS2 and from gas station GS2 to candidate destination X is $4.00, the following illustrates an example computation, given the destination uncertainty, of the expected cost of choosing the gas station GS2:

$$c_{GS2} = p(D)[C(L \to GS2 \to D) - C(L \to D)] +$$
$$p(X)[C(L \to GS2 \to X) - C(L \to X)] +$$
$$p(GS2)[C(L \to GS2 \to GS2) - C(L \to GS2)] +$$
$$= 0.5[8.15] + 0.5[4.00] + 0.0[r - r]$$
$$= 6.08$$

The automated routing system recommends the gas station associated with the minimum expected cost to the user. In the example described above, the expected costs of diverting to the gas stations at GS1,$c_{GS1}$, and GS2,$c_{GS2}$, vary with values for r and y, respectively. When destinations D and X are equally likely to be the primary destination, gas station GS2 may best satisfy the destination uncertainty with the minimum expected cost of $6.08. Furthermore, selecting gas station GS2 may result in savings of $1.37 over selecting gas station GS2.

If the automated routing system suggests the fueling station GS1, but the user is actually driving to point D, the net expected diversion cost may be computed as $3.90. Such a cost generally may be computed using a cost function, which could be based upon the extra driving distance and/or time associated with diverting the user to a waypoint, such as the gas station GS1. Similarly, if the automated routing system suggests the gas station at GS2 when the driver is actually going to point D, the cost of the diversion is $8.15.

Asking whether the primary destination is D enables the automated routing system to more accurately generate routes and/or suggest diversions. The text element 304 and/or the graphical element 306 illustrate an example comparison between visiting gas station GS1 or GS2 en route to the destination D in which respective gasoline prices contribute to each expected diversion cost. Because gasoline is more expensive at gas station GS2, the expected diversion cost is considerably higher than the expected diversion cost associated with gas station GS1. Even though gas station GS2 is closer to destination D in terms of distance, refueling the vehicle at gas station GS1 instead of gas station GS2 saves the user approximately $5.87.

Figure 4:
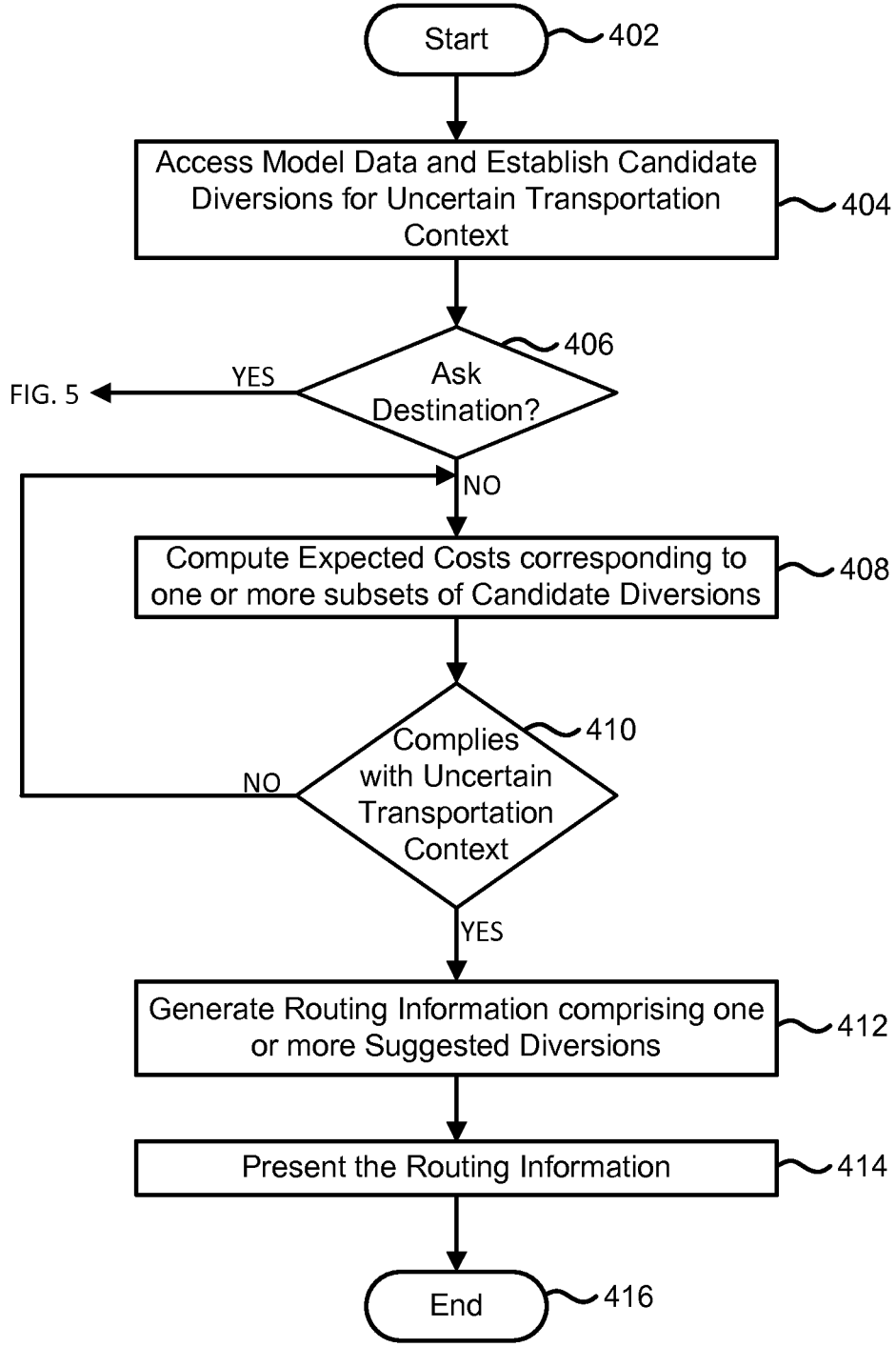
FIG. 4 is a flow diagram illustrating example steps for generating routing information based upon an uncertain transportation context according to one example implementation.

FIG. 4 is a flow diagram illustrating example steps for generating routing information based upon an uncertain transportation context according to one example implementation. One or more example components of an automated routing system may perform at least one of the example steps being illustrated in FIG. 4. The example steps commence at step 402 and proceed to step 404 at which one or more candidate destinations and one or more candidate diversions are identified for an uncertain transportation context. Probabilities may be assigned to each candidate destination based upon data from various data sources as described herein.

Step 406 determines whether to ask the user for a destination from amongst the one or more candidate destinations. If the automated routing system is configured to ask for the destination, step 406 continues to FIG. 5 where a destination inquiry may be produced. Otherwise, step 406 proceeds to step 408 at which expected costs corresponding to each candidate diversion is computed. Step 410 determines whether one or more of the candidate diversions comply with an uncertain transportation context.

According to one example implementation, the automated routing system may use Equation (2) to identify a diversion Z*corresponding to a minimum expected cost to a candidate destination D as follows:

$$Z^* = \operatorname*{argmin}_{Z \in Z_s} Z \sum_{D \in D_s} p(D)[C(L \to Z \to D) - C(L \to D)] \quad (2)$$

The automated routing system may define a cost function C as directed by user preferences corresponding to the uncertain transportation context. As an example, the cost function C may factor driving distance and time into an expected cost associated with diverting an uncertain user route to a diversion Z*. As a further example, the cost function C also may weigh the driving distance and time against other data, including environment data (e.g., time of day/day of week, traffic data, weather forecast and/or the like).

If the automated routing system can suggest a diversion, in compliance with the uncertain transportation context, step 410 proceeds to step 412. If the automated routing system does not identify a candidate diversion to suggest to the user, step 410 returns to step 408 where the expected costs are updated. Step 412 refers to generating routing information comprising one or more suggested diversions. Step 414 represents presenting the routing information to the user. As an example, the automated routing system may express the routing information as map data combined with directions and icons for specific locations. Step 416 is directed to terminating the example steps illustrated in FIG. 4.

Figure 5:
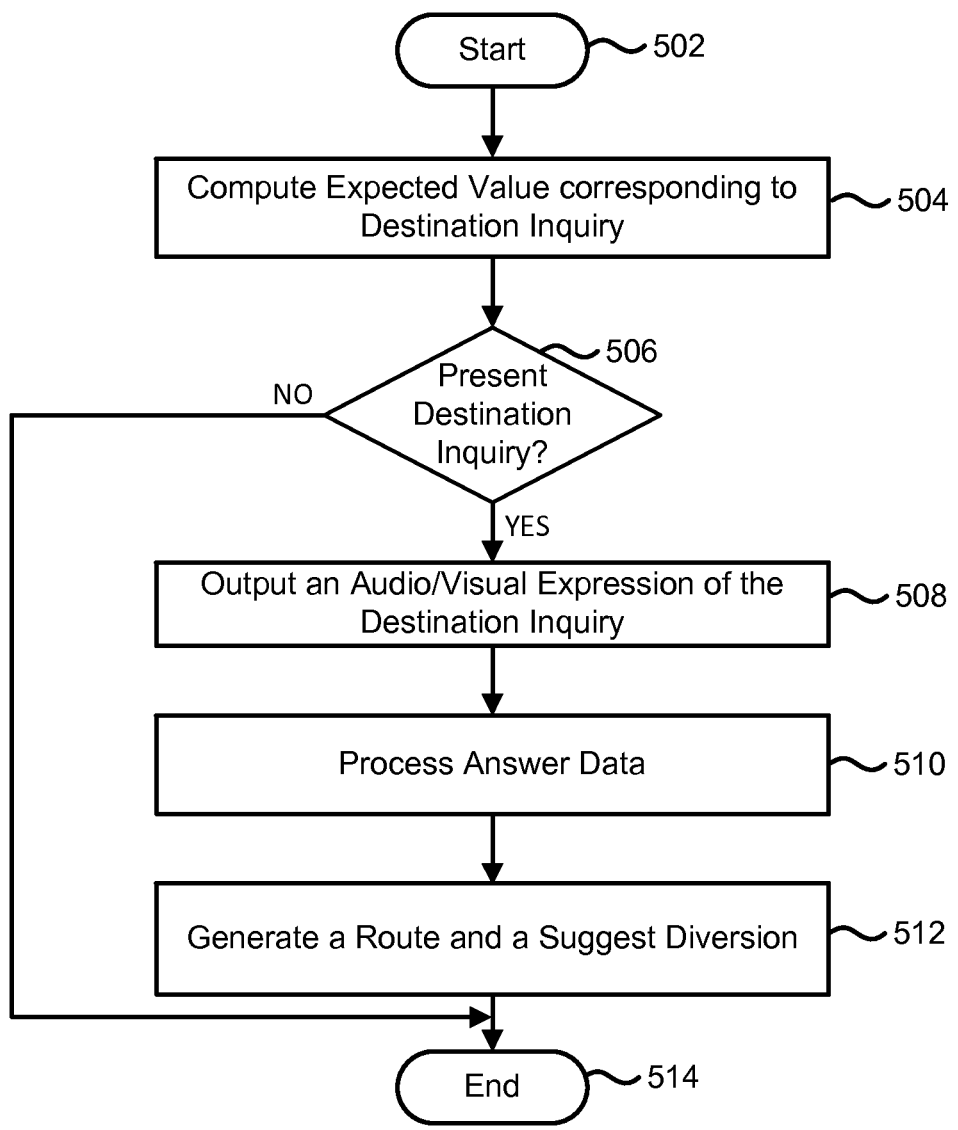
FIG. 5 is a flow diagram illustrating example steps for resolving destination uncertainty based upon an expected value of asking the user according to one example implementation.

FIG. 5 is a flow diagram illustrating example steps for resolving destination uncertainty based upon an expected value of asking the user according to one example implementation. One or more example components of an automated routing system may perform at least one of the example steps being illustrated in FIG. 5. The example steps commence at step 502 and proceed to step 504 at which an expected value corresponding to a destination inquiry is computed. As described herein, the automated routing system may compute expected diversion costs more accurately if a user's destination by inference/prediction or, alternatively, by explicitly asking via the destination inquiry.

Step 506 determines whether to present the destination inquiry to the user. An example destination inquiry generally refers to any expression (e.g., an audio/visual expression) corresponding to asking for a destination. Although presenting the destination inquiry may interrupt the user and incur a related non-trivial cost, the destination inquiry nonetheless may result in a more optimal diversion. Hence, the expected value for presenting the destination inquiry takes into account the cost of interrupting the user when determining an expected benefit of suggesting the more optimal diversion if the destination uncertainty is resolved. The destination inquiry, however, may not be needed if the automated routing system inferred a likely candidate destination. If the automated routing system does not present the destination inquiry, step 506 proceeds to step 514 where the example steps illustrated in FIG. 5 terminate.

The expected value of asking may be useful if the automated routing system cannot predict a likely destination with a high confidence and/or has a substantial number of candidate diversions to suggest. One example computation of the expected value of asking (VOA) the user about a current/primary destination is as follows:

$$VOA = \min_{Z \in Z_s} Z \sum_{D \in D_s} p(D)[C(L \to Z \to D) - C(L \to D)] - \quad (3)$$
$$\sum_{D \in D_s} p(D) \min_{Z \in Z_s} Z[C(L \to Z \to D) - C(L \to D)] + C(A)$$

Equation (3) includes a first term for computing a minimum expected cost of diverting to a waypoint (Z*) in view of destination uncertainty, as computed herein by Equation (2). A second term refers to an expected minimal cost of divergence after resolving the destination uncertainty (e.g., after inferring/asking the destination). The automated routing system may assume that the likelihood of hearing a destination as an answer is substantially equal to a current probability assigned to that destination.

To compute a current value of knowing the destination after asking, for each candidate destination, the automated routing system may select the diversion having the minimal expected cost and may sum the costs of each diversion as weighted by the probability that each destination is indeed the actual destination. Finally, the automated routing system may add a cost of asking, C(A), which is scaled to be measured in units of additional driving time that the user may be willing to incur, and thus, avoid a distracting or annoying destination inquiry.

The expected value of asking (VOA) represents a difference in an expected cost of a candidate diversion, selected under transportation context uncertainty and computed by Equation (2), and a reduced cost associated with selecting the candidate diversion for each candidate destination. The automated routing system may compute a weighted sum of the products of these costs with the likelihood of each candidate destination. The automated routing system also may account for interrupting the user with the destination inquiry with an additional cost. When the expected value is positive, the automated routing system may ask the user about the destination.

If the automated routing system decides to present the destination inquiry, step 506 proceeds to step 508 at which the automated routing system may output an audio/visual expression of the destination inquiry. An example destination inquiry generally refers to an audio/visual expression comprising a map where graphical icons represent candidate destinations and an accompanying voice recording prompts the user for answer data. Step 510 refers to processing the answer data from the user. Such answer data may be in the form of a voice/gesture response and/or a selection on a touch-screen display.

Step 512 represents generating a route and/or suggesting a diversion based upon the answer data and the expected value of asking. As the user progresses on a current trip, the automated routing system may update the expected values as the first and/or second terms of Equation (3) shift in response to changes in destination probabilities and/or a changing environment (e.g., changes to a geospatial structure and/or a road network topology relative to the current location of the vehicle). Such a cost may be constant or, alternatively, may change based upon several contextual factors, including whether a driver is currently speaking with a passenger and/or experiencing difficult driving conditions.

EXAMPLE OPERATING ENVIRONMENT

Figure 6:
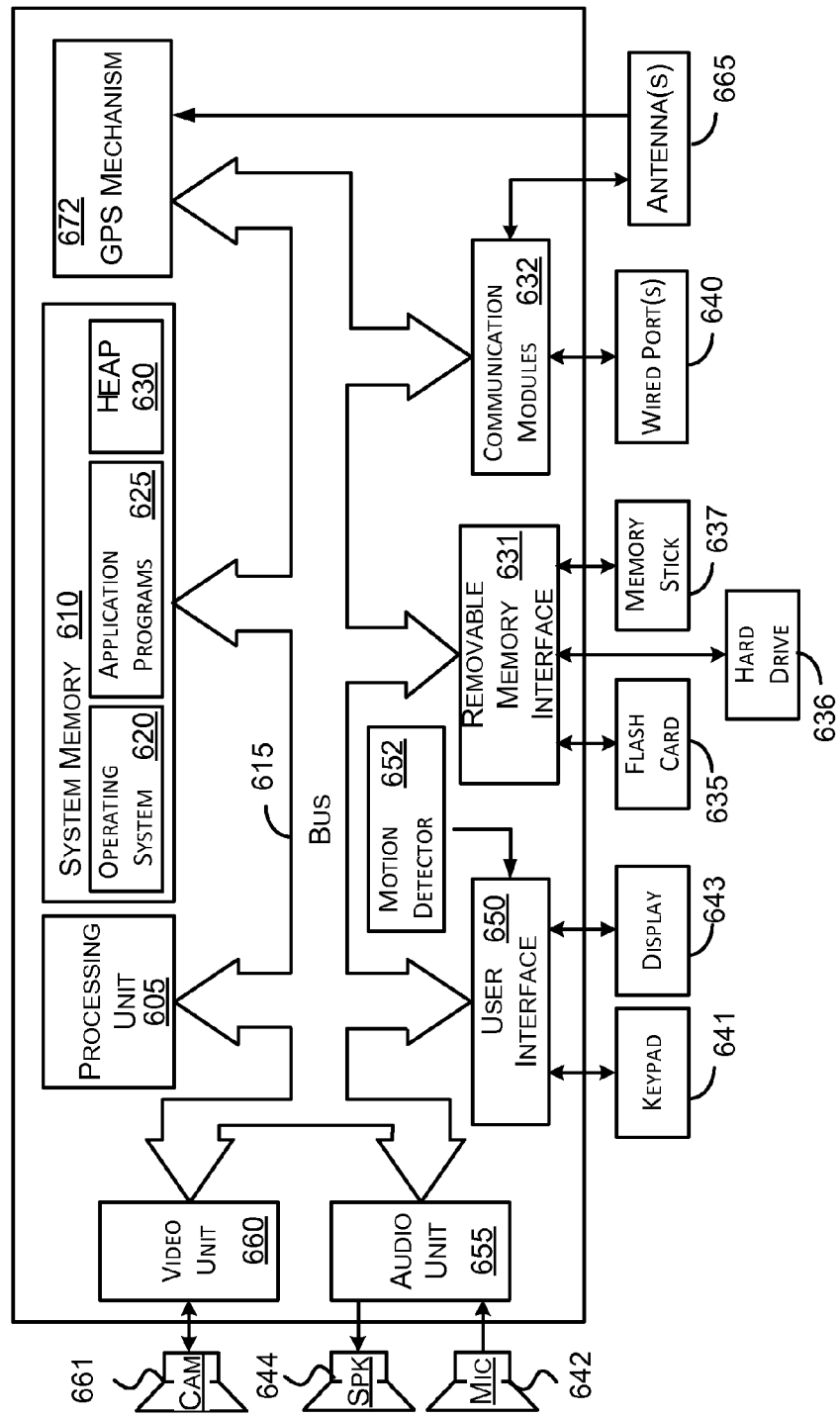
FIG. 6 illustrates an example of a suitable mobile device on which aspects of the subject matter described herein can be implemented.

FIG. 6 illustrates an example of a suitable mobile device 600 on which aspects of the subject matter described herein may be implemented. The mobile device 600 is only one example of a device and is not intended to suggest any limitation as to the scope of use or functionality of aspects of the subject matter described herein. Neither should the mobile device 600 be interpreted as having any dependency or requirement relating to any one or combination of components illustrated in the example mobile device 600.

With reference to FIG. 6, an example device for implementing aspects of the subject matter described herein includes a mobile device 600. In some embodiments, the mobile device 600 comprises a cell phone, a handheld device that allows voice communications with others, some other voice communications device, or the like. In these embodiments, the mobile device 600 may be equipped with a camera for taking pictures, although this may not be required in other embodiments. In other embodiments, the mobile device 600 may comprise a personal digital assistant (PDA), hand-held gaming device, notebook computer, printer, appliance including a set-top, media center, or other appliance, other mobile devices, or the like. In yet other embodiments, the mobile device 600 may comprise devices that are generally considered non-mobile such as personal computers, servers, or the like.

Components of the mobile device 600 may include, but are not limited to, a processing unit 605, system memory 610, and a bus 615 that couples various system components including the system memory 610 to the processing unit 605. The bus 615 may include any of several types of bus structures including a memory bus, memory controller, a peripheral bus, and a local bus using any of a variety of bus architectures, and the like. The bus 615 allows data to be transmitted between various components of the mobile device 600.

The mobile device 600 may include a variety of computer-readable media. Computer-readable media can be any available media that can be accessed by the mobile device 600 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 600.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, Wi-Fi, WiMAX, and other wireless media. Combinations of any of the above should also be included within the scope of computer-readable media.

The system memory 610 includes computer storage media in the form of volatile and/or nonvolatile memory and may include read only memory (ROM) and random access memory (RAM). On a mobile device such as a cell phone, operating system 620 is sometimes included in ROM although, in other embodiments, this is not required. Similarly, application programs 625 are often placed in RAM although again, in other embodiments, application programs may be placed in ROM or in other computer-readable memory. The heap 630 provides memory for state associated with the operating system 620 and the application programs 625. For example, the operating system 620 and application programs 625 may store variables and data structures in the heap 630 during their operations.

The mobile device 600 may also include other removable/non-removable, volatile/nonvolatile memory. By way of example, FIG. 6 illustrates a flash card 635, a hard disk drive 636, and a memory stick 637. The hard disk drive 636 may be miniaturized to fit in a memory slot, for example. The mobile device 600 may interface with these types of non-volatile removable memory via a removable memory interface 631, or may be connected via a universal serial bus (USB), IEEE 4394, one or more of the wired port(s) 640, or antenna(s) 665. In these embodiments, the removable memory devices 635-637 may interface with the mobile device via the communications module(s) 632. In some embodiments, not all of these types of memory may be included on a single mobile device. In other embodiments, one or more of these and other types of removable memory may be included on a single mobile device.

In some embodiments, the hard disk drive 636 may be connected in such a way as to be more permanently attached to the mobile device 600. For example, the hard disk drive 636 may be connected to an interface such as parallel advanced technology attachment (PATA), serial advanced technology attachment (SATA) or otherwise, which may be connected to the bus 615. In such embodiments, removing the hard drive may involve removing a cover of the mobile device 600 and removing screws or other fasteners that connect the hard drive 636 to support structures within the mobile device 600.

The removable memory devices 635-637 and their associated computer storage media, discussed above and illustrated in FIG. 6, provide storage of computer-readable instructions, program modules, data structures, and other data for the mobile device 600. For example, the removable memory device or devices 635-637 may store images taken by the mobile device 600, voice recordings, contact information, programs, data for the programs and so forth.

A user may enter commands and information into the mobile device 600 through input devices such as a key pad 641 and the microphone 642. In some embodiments, the display 643 may be touch-sensitive screen and may allow a user to enter commands and information thereon. The key pad 641 and display 643 may be connected to the processing unit 605 through a user input interface 650 that is coupled to the bus 615, but may also be connected by other interface and bus structures, such as the communications module(s) 632 and wired port(s) 640. Motion detection 652 can be used to determine gestures made with the device 600.

A user may communicate with other users via speaking into the microphone 642 and via text messages that are entered on the key pad 641 or a touch sensitive display 643, for example. The audio unit 655 may provide electrical signals to drive the speaker 644 as well as receive and digitize audio signals received from the microphone 642.

The mobile device 600 may include a video unit 660 that provides signals to drive a camera 661. The video unit 660 may also receive images obtained by the camera 661 and provide these images to the processing unit 605 and/or memory included on the mobile device 600. The images obtained by the camera 661 may comprise video, one or more images that do not form a video, or some combination thereof.

The communication module(s) 632 may provide signals to and receive signals from one or more antenna(s) 665. One of the antenna(s) 665 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 672. In turn, the GPS mechanism 672 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 600 may connect to one or more remote devices. The remote devices may include a personal computer, a server, a router, a network PC, a cell phone, a media playback device, a peer device or other common network node, and typically includes many or all of the elements described above relative to the mobile device 600.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for generating routing information based upon destination uncertainty for a vehicle, the method performed at least in part on at least one processor, the method comprising:
    processing a transportation context associated with the vehicle, the transportation context comprising a set of rules defined by a user, the set of rules defining cost thresholds associated with candidate destinations;
    identifying a plurality of candidate destinations;
    determining, from the plurality of candidate destinations, an inferred primary destination;
    generating at least one destination-centric route to the inferred primary destination;
    while the vehicle is in route on the at least one destination-centric route, identifying a set of candidate diversions given the destination uncertainty, the transportation context, and the inferred primary destination, the set of candidate diversions associated with the inferred primary destination and located away from the at least one destination-centric route;
    examining subsets of the candidate diversions to determine whether at least one subset corresponds to an expected cost of complying with the transportation context;
    generating an opportunistic route through at least one candidate diversion of the at least one subset of the candidate diversions and to the inferred primary destination;
    comparing a first value of confirming, with the user, the opportunistic route through the at least one candidate diversion against a second value of not confirming the opportunistic route with the user, the second value being based at least in part on additional driving time for diverting to the at least one candidate diversion in view of an uncertainty of the at least one candidate diversion;
    upon comparing the first value with the second value, confirming or not confirming the opportunistic route; and
    presenting the opportunistic route on a map.

2. The method of claim 1 further comprising generating routing information comprising the at least one subset of candidate diversions, including computing a probability for one or more candidate destinations, and establishing the set of candidate diversions for the plurality of candidate destinations.

3. The method of claim 1 further comprising selecting one or more candidate diversions of the of candidate diversions, the one or more candidate diversions correspond to a minimum expected cost given the transportation context.

4. The method of claim 1 further comprising updating expected costs corresponding to the subsets of the set of candidate diversions.

5. The method of claim 1 further comprising computing an expected value corresponding to a destination inquiry.

6. The method of claim 5 further comprising producing an expression associated with the destination inquiry via one or more input/output devices, and in response to answer data related to the destination inquiry, generating at least one of a suggested route or a suggested diversion.

7. The method of claim 1, wherein examining the subsets of the set of candidate diversions further comprises inferring the inferred primary destination based upon user related data.

8. The method of claim 1 further comprising generating routing information from the at least one candidate diversion back to a start position.

9. The method of claim 1, wherein examining the subsets of the updated set of candidate diversions further comprises estimating expected divergence costs associated with one or more of the subsets of the updated set of candidate diversions.

10. The method of claim 1 further comprising:
upon determining that the at least one candidate diversion, pruning the updated set of candidate diversions to exclude one or more other candidate diversions.

11. In a computing environment, an automated routing system comprising:
a memory area storing transportation context and routing information, the transportation context comprising a set of rules defined by a user, the set of rules defining cost thresholds associated with candidate destinations; and
a processor programmed to:
process data, using an interface component, corresponding to one or more candidate destinations;
generate at least one destination-centric route, using the interface component, to an inferred primary destination of the one or more candidate destinations;
while a vehicle is in route on the at least one destination-centric route, generate opportunistic routing information, using an estimator component, based upon the inferred primary destination and the transportation context, the opportunistic routing information including at least one first candidate diversion between a start position and the inferred primary destination of the one or more candidate destinations;
receive the opportunistic routing information by an output component;
compare a first value of confirming, with the user, the opportunistic route through the at least one first candidate diversion against a second value of not confirming the opportunistic route with the user, the second value being based at least in part on additional driving time for diverting to the at least one first candidate diversion in view of an uncertainty of the at least one first candidate diversion;
upon comparing the first value with the second value, confirm or not confirming the opportunistic route; and
present the opportunistic route on a map.

12. The system of claim 11, wherein the processor is further programmed to estimate, using the estimator component, expected divergence costs associated with the at least one first candidate diversions using a plurality of data sources corresponding to a plurality of waypoints within a geographic area or a driving time interval.

13. The system of claim 11, wherein the processor is further programmed to, by using the output component, receive map data from an interface component, and present a portion of the map data on the map, the map data including a suggested route and a voice recording when a vehicle is currently in motion.

14. The system of claim 11, wherein the processor is further programmed to, by using the output component, receive an audio/visual expression from the interface component, and present the audio/visual expression, the audio/visual expression corresponding to a suggested diversion associated with a minimum expected cost.

15. The system of claim 11, wherein the processor is further programmed to compute, using the estimator component, an expected value corresponding to a destination inquiry for resolving the one or more candidate destinations.

16. The system of claim 11, wherein the processor is further programmed to identify, using the estimator component, a vehicle service station between the start position and the one or more candidate destinations, and communicate a reserve request to the vehicle service station.

17. The system of claim 11, wherein the processor is further programmed to prune the one or more candidate destinations in response to vehicle movement.

18. One or more computer-readable hardware devices having computer-executable instructions, which upon execution perform operations, comprising:
processing a transportation context corresponding to a vehicle, wherein the transportation context does not include a certain destination and thereby indicates destination uncertainty, the transportation context comprising a set of rules defined by a user, the set of rules defining cost thresholds associated with candidate destinations;
while the vehicle is in route to a destination inferred from the transportation context, identifying a plurality of candidate destinations;
identifying candidate diversions that satisfy the transportation context, the candidate diversions associated with the plurality of candidate destinations;
while the vehicle is in route to the known destination, selecting one of the candidate diversions based upon the transportation context;
generate an opportunistic route through the one of the candidate diversions and to the inferred primary destination of the plurality of candidate destinations;
comparing a first value of confirming, with the user, the opportunistic route through the one of the candidate diversions against a second value of not confirming the opportunistic route with the user, the second value being based at least in part on additional driving time for diverting to the one of the candidate diversions in view of an uncertainty of the one the candidate diversions;
upon comparing the first value with the second value, confirming or not confirming the opportunistic route; and
presenting the opportunistic route on a map.

19. The one or more computer-readable hardware devices of claim 18 having further computer-executable instructions comprising:
presenting a destination inquiry on an input/output device;
processing user selection of a destination; and
suggesting at least one of the candidate diversions en route to the destination based upon user related data.

20. The one or more computer-readable hardware devices of claim 18 having further computer-executable instructions comprising:

accessing a plurality of data sources associated with the transportation context, the plurality of data sources comprising at least one of driver history, vehicle-related data, candidate diversion-related statistics, and current environment data.

\* \* \* \* \*